United States Patent [19]

Nadsady et al.

[11] 3,891,291

[45] June 24, 1975

[54] TUBING COUPLING INCORPORATING BRIDGING CONDUCTOR

[75] Inventors: Clarence A. Nadsady, Downey; Clifford D. Cannon, Lahabra, both of Calif.

[73] Assignee: E. B. Wiggins, Inc., Los Angeles, Calif.

[22] Filed: Feb. 5, 1974

[21] Appl. No.: 440,084

[52] U.S. Cl. .................... 339/15; 174/78; 174/94 S; 339/117 R
[51] Int. Cl. ........................ H01r 3/04; H02g 15/08
[58] Field of Search.......... 174/84 R, 84 S, 86, 94 R, 174/94 S, 78; 339/14 R, 14 L, 117 R, 8 R, 15, 16

[56] References Cited
UNITED STATES PATENTS

| | | | |
|---|---|---|---|
| 2,424,436 | 7/1947 | Crater | 285/408 |
| 2,738,207 | 3/1956 | Twigg, Jr. | 285/408 |
| 3,406,991 | 10/1968 | Decker, Jr. et al. | 285/408 |
| 3,649,946 | 3/1972 | Frowein | 339/8 R |
| 3,778,610 | 12/1973 | Wolf | 174/86 X |

*Primary Examiner*—Darrell L. Clay
*Attorney, Agent, or Firm*—Paul A. Weilein

[57] ABSTRACT

A coupling for two tubing ends which tubing ends are equipped with radial end flanges either in the form of radial beads in the tubing or in the form of radial flanges of ferrules that are swaged to the tubing ends. The coupling per se is of conventional construction wherein an annular retainer structure straddles the radial end flanges of the confronting tubing ends for the purpose of mechanically interconnecting the confronting tubing ends. The invention adds an elongated leaf spring conductor of undulating configuration which is enclosed by the annular retainer structure and serves as an electrical bridge between the two radial end flanges of the two tubing ends.

14 Claims, 18 Drawing Figures

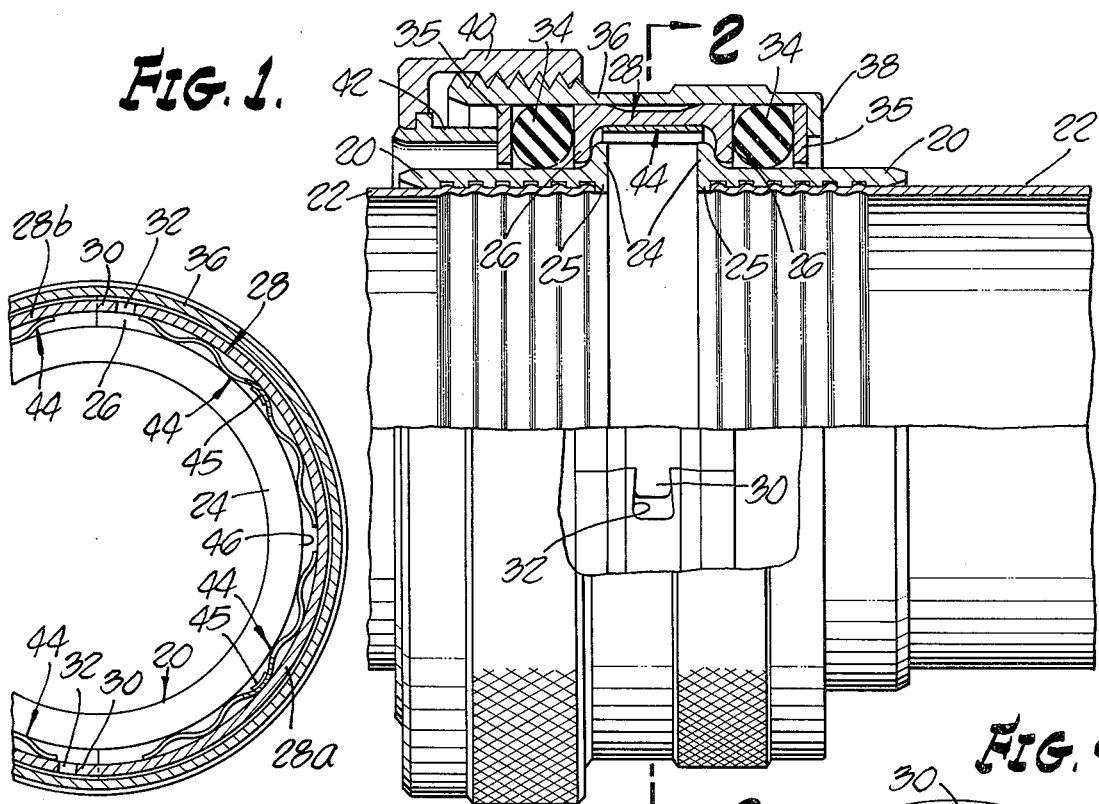
FIG. 1.
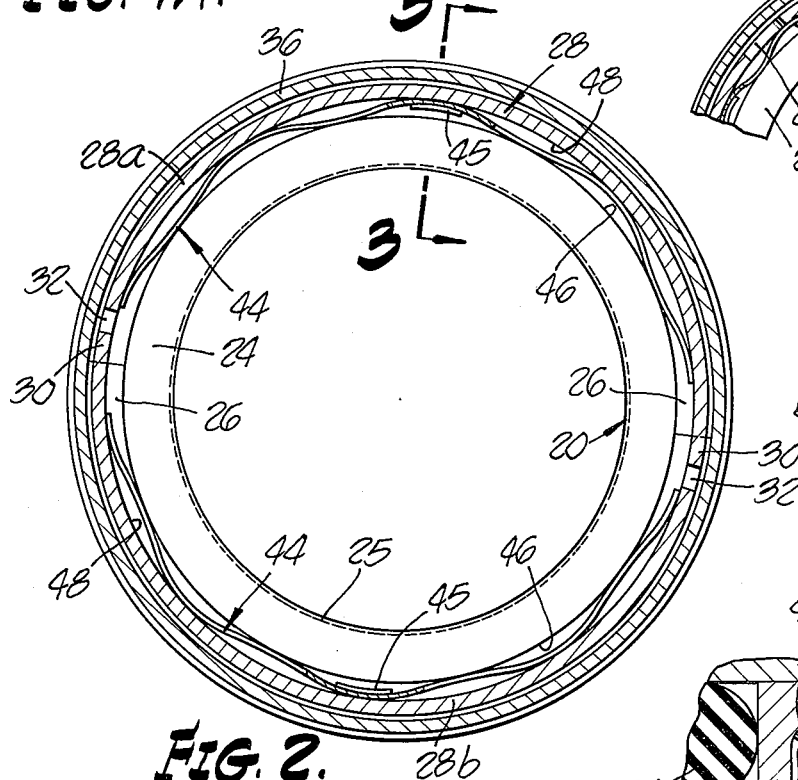
FIG. 4A.
FIG. 2.
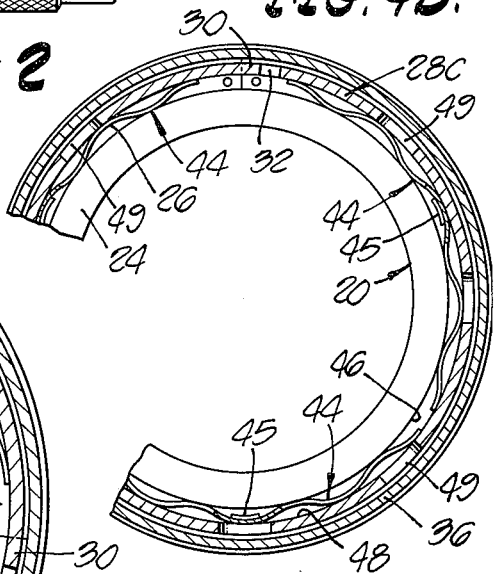
FIG. 4B.
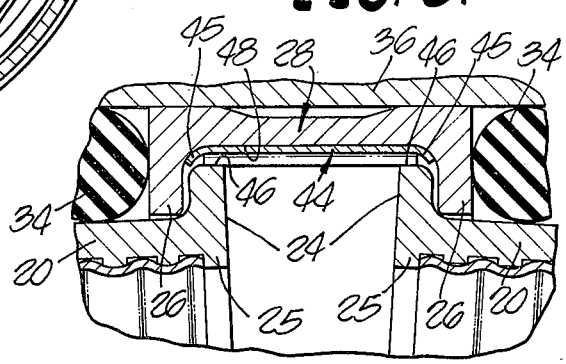
FIG. 3.

PATENTED JUN 24 1975  SHEET 2  3,891,291

TUBING COUPLING INCORPORATING BRIDGING CONDUCTOR

BACKGROUND OF THE INVENTION

It is a well known physical phenomenon that static electricity can be created in tubing, ducts, and connection lines by the flow of fluid therethrough, and that when the electrostatic charge becomes sufficiently large it is dissipated by flowing to a ground or a lower charged area. When the two areas are physically separated by an intervening gap, the discharge of the electrostatic electricity from a point of relatively high potential to a point of relatively low potential can create a spark which, under certain circumstances or in certain environments, can be a source of potential danger.

To guard against such contingencies and to provide safe operating conditions, it has been common practice, as in the case of aircraft fluid lines carrying inflammable fluids, to ground the fluid-carrying tubing or piping to aircraft frame structure by means of electrical conductors to prevent the occurrence of spark discharges which could ignite volatile fluid vapors. Such a grounding conductor is usually referred to as a "bonding jumper" and typically consists of a braided copper or aluminum wire or cable assembly in which swaged connection terminals are provided at each end, these terminals having openings to receive screws or bolts. In this practice, the tubing is generally bonded at intervals of approximately two feet, the bonding jumpers being attached to the tubing by means of circular clamps utilizing screws, nuts and washers. Before the clamp is applied, the tubing is stripped of its surface finish to assure proper contact and finally, to prevent corrosion, paint is applied after the clamp is installed.

An advance in the art beyond this common practice is disclosed in the Tuger U.S. Pat. No. 3,753,205, issued Aug. 14, 1973, entitled COUPLER DEVICE FOR TUBING ENDS PROVIDING MECHANICAL AND ELECTRICAL CONNECTIONS THEREWITH, which patent is hereby incorporated into the present disclosure by reference.

When a ferrule is swaged onto a tubing end in the Tuger disclosure, a T-shaped inner end of an external bonding jumper cable is permanently trapped between the ferrule and the tubing end for electrical connection to the tubing end and the ferrule is cut away to provide what is termed an entrance slot to clear the jumper cable. The final step in the operation of assembling the coupler is to seal the entrance slot with epoxy adhesive which extends to adjacent portions of the coupling to serve as a sealant against contamination.

SUMMARY OF THE INVENTION

Objects of the invention include: to eliminate the need for cutting entrance slots in the two ferrules; to eliminate the need for applying epoxy to the assembled coupling as a sealant against contamination; to eliminate the need for employing bonding jumper cables; to avoid the necessity for involving any type of electrical conductor in the operation of swaging a ferrule to a tubing end; to provide an electrical bridge between the radial end flanges of two confronting tubing ends, which electrical bridge lies wholly inside the assembled coupling, thus eliminating the need for any kind of external conductor; to provide a bridging conductor of resilient construction that is automatically compressed between the annular retainer structure and the radial end of the confronting tubing ends in the course of assembling the coupling, thereby providing permanent pressure contact between the bridging conductor and the radial end flanges of the two confronting tubing ends even when the two tubing ends are out of alignment with each other; to provide such a bridging conductor that may be sold separately as an article of commerce for quick incorporation into a conventional coupling in a simple and convenient manner; to provide an assembly comprising a semicircular section of a conventional annular retainer and a bridging conductor connected thereto, which assembly may be sold as a separate subcombination for incorporation into a conventional coupling; and to provide such a bridging conductor that may be attached to a conventional semicircular section of an annular retainer by a simple wedging operation that requires neither skill nor any special tool.

The invention provides an elongated leaf spring conductor that may be placed inside a conventional annular retainer structure to function as a bridging conductor between the radial end flanges of the two confronting tubing ends that are engaged by the retainer structure. The conventional annular retainer structure may comprise a split one-piece retainer ring or a pair of retainer ring sections having radially inward side flanges that straddle the two radial end flanges of the confronting tubing ends or the conventional annular retainer structure may comprise an assembly of separate parts that includes a pair of plain split washers that straddle the two radial end flanges of the tubing.

Preferably, the elongated leaf spring is of undulating configuration in longitudinal cross section for contact with the outer circumferential surfaces of the radial end flanges of the two confronting tubing ends, provision being made for such outer circumferential surfaces to be conducting surfaces. The undulating leaf spring extends in a circumferential direction and is shaped and constructed for radial compression between the annular retainer structure and the enclosed end flanges of the confronting tubing ends to assure pressure contact of the leaf spring with the two end flanges.

In one embodiment of the invention, the enclosed bridging leaf spring is shaped and dimensioned to be wedged into engagement with a semicircular annular retainer section. In other embodiments of the invention the leaf spring conductor is attached to the semicircular annular retainer section by adhesive bonding or by heat bonding and where heat bonding is employed the leaf spring may be bonded to an insert that has forced fit with the annular retainer section. In some other embodiments of the invention the bridging leaf spring is lanced to form at least one tongue that extends through an aperture in the web of a semicircular retainer section and is bent over into positive engagement with the web. Finally, in still further embodiments of the invention, ultimate simplicity is achieved by providing a simple bridging leaf spring that may be inserted into various coupling assemblies with no necessity for attaching the bridging leaf spring to any component of the coupling assemblies.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a side elevation, partly in section, of a conventional coupling embodying the presently preferred practice of the invention;

FIG. 2 is a transverse section taken as indicated by the line 2—2 of FIG. 1;

FIG. 3 is a radial section on an enlarged scale taken as indicated by the line 3—3 of FIG. 2;

FIG. 4A is a sectional view like FIG. 2 on a reduced scale showing how a plurality of bridging leaf spring conductors of the character shown in FIGS. 1–4 may be used in a semicircular retainer section of a coupling of relatively large diameter;

FIG. 4B is a similar sectional view showing a plurality of the same bridging leaf spring conductors mounted in a circular retainer that is in the form of a split ring;

DESCRIPTION OF THE SELECTED EMBODIMENTS OF THE INVENTION

Figure 16:
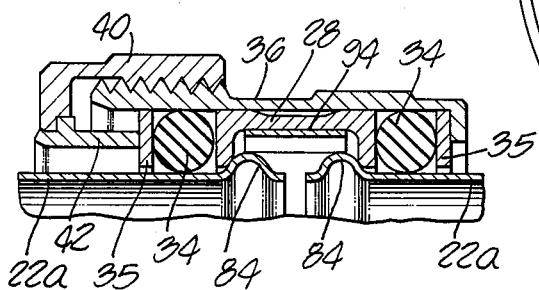
FIG. 16 is a fragmentary sectional view showing how a bridging leaf spring conductor may be employed in the coupling shown in FIG. 1 with the semicircular retainer ring of the coupling straddling radial end beads of the two confronting tubing ends.

The construction of the various mechanical couplings shown in the drawings, apart from the provision for conducting electricity, are conventional. In FIGS. 1 and 16 the couplings are identical with the mechanical coupling disclosed in the above mentioned U.S. Pat. No. 3,753,205.

Referring to FIG. 1, conventional ferrules 20 are swaged onto the confronting ends of two tubing members 22 that are to be coupled together, each ferrule having a radial end flange 24 and a corresponding inner circumferential flange 25. The inner flange 25 serves as a stop for correct positioning of the ferrule on an end of a tubing member in preparation of the operation of swaging the ferrule onto the tubing member.

In the assembled coupling, the inward side flanges 26 of an annular retainer 28 straddle the confronting radial end flanges 24 of the two ferrules 20 to mechanically interconnect the two tubing members 22. In this instance, the annular retainer 28 comprises two semicircular retainer sections 28a and 28b which interlock with each other. As shown in FIG. 1, the interlocking relationship between the two retainer sections is provided by tongues 30 and cooperating slots 32 at the junctures of the two sections 28a and 28b. A pair of O-rings 34 embrace the two ferrules 20, respectively, with each O-ring confined between the annular retainer 28 and a split washer 35 that is capable of being expanded to clear the radial end flange 24 of a ferrule.

An annular coupling body 36 is formed with an inner radial flange 38 that lies against the outer side surface of one of the split washers 35 and an annular nut member 40 that screws onto the other end of the coupling body has a cylindrical flange 42 that bears against the outer side surface of the other split washer 38. It is apparent that tightening the nut member 40 onto the annular coupling body 36 places the two O-rings 34 under pressure for sealing effectiveness.

The structure described to this point is, of course, conventional except for the fact that the outer circumferential surfaces of the two radial end flanges 24 of the two ferrules 20 are electrical conducting surfaces. To provide such surfaces any anodizing or other protective coatings on the two ferrules 20 are removed at the outer circumferential surfaces of the radial end flanges 24 of the ferrules and then the exposed bare metal surfaces of the radial end flanges are coated with suitable noncorrosive conducting material. Since the operation of swaging a ferrule 20 onto a tubing member 22 assures electrical conductivity between the ferrule and the tubing member even though the ferrule and tubing member may be initially coated with nonconducting material, the outer circumferential surface of the end flange 24 of a ferrule is in electrical conducting communication with the tubing member 22 on which the ferrule is mounted.

The invention teaches that electrical communication between the two tubing members 22 in FIG. 1 may be established by simply employing a suitable conductor as a bridge between the conducting outer circumferential surfaces of the radial end flanges 24 of the two ferrules 20.

In the first embodiment of the invention illustrated by FIGS. 1–4, the bridging conductor is in the form of a leaf spring 44 which may, for example, be made of beryllium copper. As shown in FIG. 2, preferably a leaf spring 44 is mounted in each of the two semicircular sections 28a and 28b of the annular retainer 28.

Figure 4:
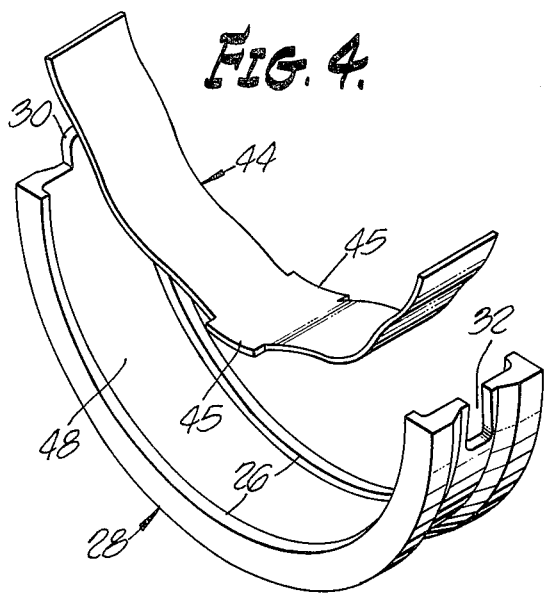
FIG. 4 is an exploded view of a semicircular annular retainer section and an associated bridging leaf spring conductor employed in FIG. 1 of the drawings.

In FIG. 4 it can be seen that a leaf spring 44 is of uniform width throughout the major portion of its length but is formed with two directly opposite lateral projections or ears 45. As shown in FIG. 1, the leaf spring 44 is of a width to fit against the inner circumferential wall of a retainer section and, as shown in FIG. 3, the two ears 45 increase the width of the leaf spring to permit the leaf spring to be attached to the retainer section by wedging the leaf spring into place. When the portion of the leaf spring 44 that is formed with the ears 45 is forced into a section of the annular retainer 28, the ears 45 wedge into locking engagement with the two opposite side flanges 26 of the retainer in the manner indicated in FIG. 3.

Longitudinally the leaf spring 44 is of undulating configuration as indicated in FIG. 2 with some of the undulations making contact with the outer circumferential surfaces 46 of the two radial end flanges 24 of the two ferrules 20 and with the alternate undulations backing against the inner circumferential surface 48 of the web of the annular retainer 28. It can be seen in FIG. 2 that when the coupling is assembled, the leaf spring 44 is compressed into an annular space that is defined by the inner circumferential surface 48 of the retainer 28 and the outer circumferential surfaces 46 of the radial end flanges 24 of the two ferrules 20. When a leaf spring 44 is unrestrained, i.e., when it is not confined between the annular retainer 28 and the radial end flanges 24 of the two ferrules, the radial dimension of the leaf spring as measured across its opposite undulations is substantially greater than the radial distance between the two confining surfaces 46 and 48. Thus, installing the leaf spring 44 in a retainer section in an assembled coupling causes the leaf spring to be radially compressed to cause the inner undulations of the leaf spring to make sustained pressure contact with the outer circumferential surfaces 46 of the radial end flanges 24 of the two ferrules 20.

In FIG. 4A, which is largely identical with FIG. 2 as indicated by the use of corresponding reference numerals to indicate corresponding parts, the coupling is of relatively large diameter and is of sufficient circumferential dimension to permit two of the leaf springs 44 to be mounted in each of the two semicircular retainer sections 28a and 28b.

FIG. 4B is largely identical with FIG. 4A as indicated by corresponding reference numerals for corresponding parts. The essential difference is that a single split ring retainer 28c of well known construction is substituted for the two retainer sections 28a and 28b. A well known type of special tool may be employed to spread the split retainer 28c sufficiently to clear the radial end flanges 24 of the ferrules 20 as required in assembling the coupling. The web of the split ring retainer 28c may have spaced apertures 49 that both reduce the weight of the split ring retainer and reduce its resistance to spreading action by the special tool.

Figure 5:
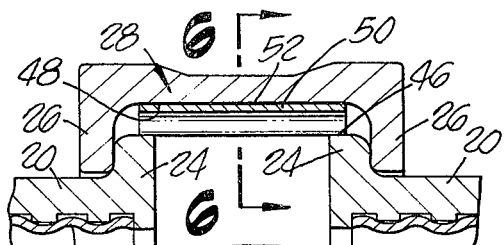
FIG. 5 is a fragmentary longitudinal section showing how a bridging leaf spring conductor may be adhesively bonded to the inner surface of a conventional semicircular retainer section.
Figure 6:
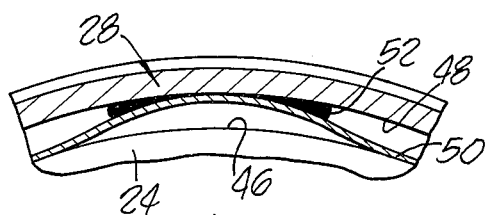
FIG. 6 is a fragmentary transverse section taken as indicated by the line 6—6 of FIG. 5.

In the embodiment of the invention illustrated by FIGS. 5 and 6, a leaf spring 50 is similar to the previously described leaf spring 44 but does not have any ears 45, the leaf spring 50 being of uniform width throughout its length. The leaf spring 50 is attached to the inner surface of a section of the annular retainer 28 by adhesive bonding, for example, by a layer 52 of epoxy at an outer undulation of the leaf spring that is midway between its two ends.

Figure 7:
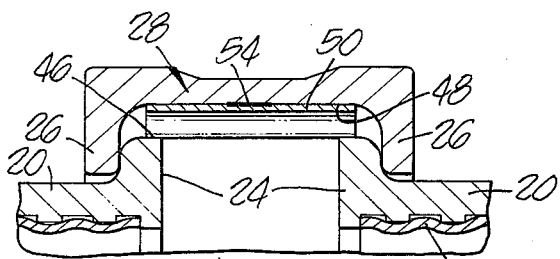
FIG. 7 is a view similar to FIG. 5 showing how a bridging leaf spring conductor may be spot welded to the interior of a conventional semicircular retainer section.

In the embodiment of the invention shown in FIG. 7 the leaf spring 50 of uniform width is bonded to the semicircular section of the annular retainer 28 by spot welding 54 in the region of the central outward undulation of the leaf spring.

Figure 8:
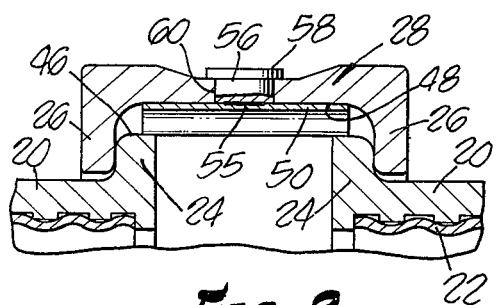
FIG. 8 is a similar view showing how a bridging leaf spring conductor may be heat bonded to an insert that has forced fit with a semicircular retainer section.

If the semicircular section of the annular retainer 28 is made of a metal that is not suitable for spot welding, the central undulation of the leaf spring 50 may be joined by spot welding 55 to a plug 56 of suitable metal as indicated in FIG. 8. The plug 56 has an outer end flange 58 and is driven with forced fit into a radial bore 60 in the annular retainer.

Figure 9:
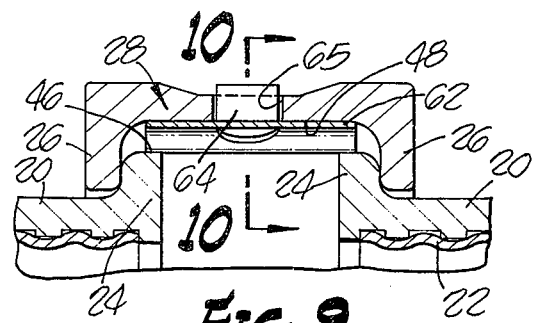
FIG. 9 is a view similar to FIG. 7 showing how a bridging leaf spring conductor may be lanced to form a tongue that extends through an aperture in the web of a semicircular retainer section and is bent over for positively attaching the bridging conductor to the retainer section.
Figure 11:
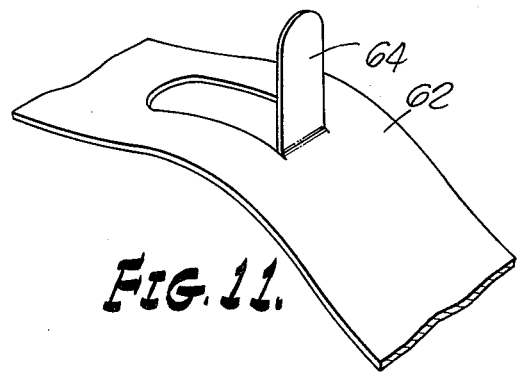
FIG. 11 is a fragmentary perspective view showing how the material of a bridging leaf spring conductor may be lanced and bent to form the tongue shown in FIGS. 9 and 10.
Figure 10:
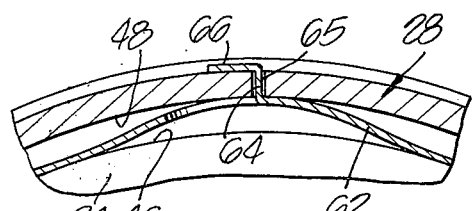
FIG. 10 is a fragmentary transverse section taken as indicated by the line 10—10 of FIG. 9.

In the practice of the invention illustrated by FIGS. 9–11, an undulating leaf spring 62 of uniform width is lanced to form an outwardly extending tongue 64 and the semicircular section of the retainer 28 into which the leaf spring is to be mounted is provided with a corresponding radial opening or slot 65. The tongue 64 is midway between the two ends of the section of the annular retainer and the slot 65 is midway between the two ends of the section of the retainer 28. After the tongue 64 is inserted radially outwardly in the slot 65 an end portion 66 of the tongue is bent back against the outer peripheral surface of the retainer section as shown in FIGS. 9 and 10.

Figure 12:
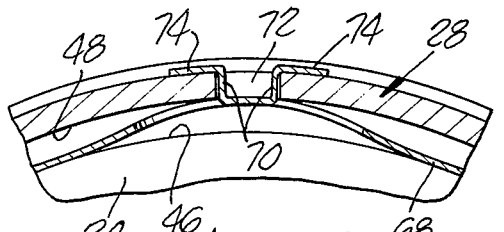
FIG. 12 is a fragmentary sectional view similar to FIG. 10 showing how a bridging leaf spring conductor may be formed with two tongues which extend through an aperture in the web of a semicircular retainer section and are bent over in opposite directions for positive engagement with the retainer section.

FIG. 12 shows how a leaf spring 68 of uniform width may be lanced and formed with two tongues 70 to fit into a radial opening 72 in a semicircular retainer section. After the two tongues 70 are inserted into the radial opening 72, end portions 74 of the two tongues are bent down in opposite directions against the outer circumferential surface of the retainer section.

Although the foregoing embodiments of the invention have been illustrated as embodying the use of at least two leaf springs 44, which are anchored inside semicircular retainer sections, the invention may be practiced in its broad aspects by the use of a single continuous leaf spring 44 which is not anchored in the retainer ring. For example, such a leaf spring may be nearly coextensive with a split ring retainer.

It is apparent that the leaf spring 44 shown in FIG. 4 and the leaf springs 50 shown in FIGS. 5–8 can be sold as separate items to be installed by the purchaser in conventional tubing couplers. It is also apparent that semicircular retainer sections with the leaf springs attached thereto may be sold separately as subassemblies for incorporation into conventional tubing couplers.

An important feature of the invention is that the resiliency of the elongated leaf spring not only results in sustained pressure contact with the radial end flanges of the two ferrules, but also assures such contact when the two ferrules are out of axial alignment with each other. Thus, if the two tubing ends are at slight angles relative to each other, the resilient leaf spring accommodates itself to the angular relationship. This adaptability of the leaf spring is illustrated by FIG. 3.

Figure 13:
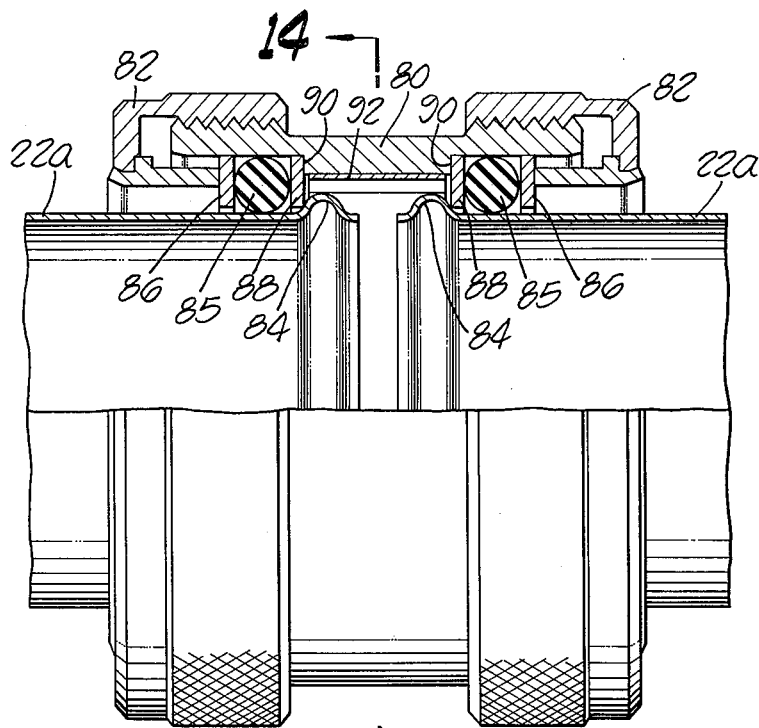
FIG. 13 is a view similar to FIG. 1 showing how an unattached bridging leaf spring conductor may be used in a coupling wherein an annular retainer assembly includes a pair of split rings that straddle radial beads on the confronting coupling ends.

In a well known coupling construction shown in FIG. 13, a coupling body 80 is equipped with two end nuts 82 of the character shown in FIG. 1 and confines an annular retainer structure to interconnect two tubing members 22a that have radial end flanges in the form of radial beads 84. The two end nuts confine two O- rings 85, two outer split washers 86 and two inner split washers 88 that back against coupling shoulders 90. It is apparent that in the annular retainer structure, the two inner split washers 88 straddle the two radial end flanges or beads 84 in the same manner as the inward side flanges 26 of the annular retainer 28 of FIG. 1 and that the portion of the coupling 80 that spans the two inner split washers 88 corresponds to the web of the annular retainer 28.

Figure 14:
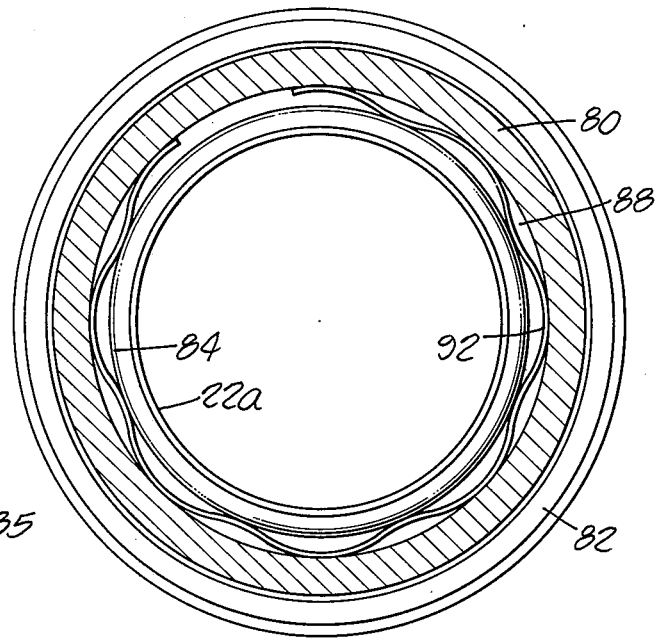
FIG. 14 is a section along the line 14—14 of FIG. 13.

As shown in FIG. 14, a single bridging leaf spring conductor 92 of nearly 360° circumferential extent is compressed radially between the inner circumferential wall of the coupling body and the two radial end beads 84. The leaf spring 92 is of undulating configuration and is equivalent to a plurality of the previously described leaf springs 44 connected end to end. It is to be noted, however, that leaf spring 92 is a plain leaf spring in that it does not have the ears 45 (FIG. 4) of leaf spring 44 and is not bonded nor mechanically connected to the annular retainer structure.

Figure 15:
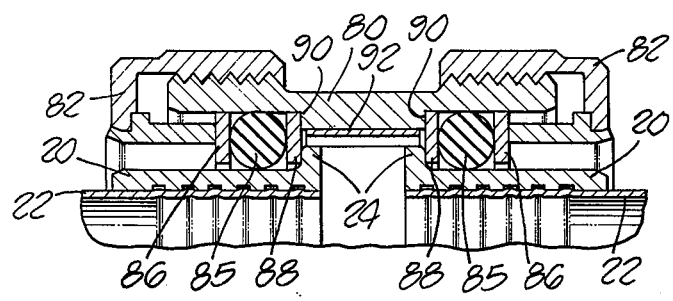
FIG. 15 is a fragmentary sectional view similar to FIG. 13 showing how an unattached bridging leaf spring may be employed in the coupling of FIG. 13 with the pair of split rings straddling the end flanges of ferrules that are swaged to the confronting tubing ends.

In FIG. 15, the same coupling construction as shown in FIG. 13 is employed as indicated by the use of corresponding reference numerals to designate corresponding parts. The coupling interconnects two tubing members 22 that are shown in FIG. 1. The two tubing members 22 are equipped with swaged ferrules 20 which provide corresponding radial end flanges 24. A bridging leaf spring 92 is of the same character as shown in FIG. 14.

FIG. 16 shows the same coupling construction as FIG. 1, as indicated by the use of the same reference numerals. In this instance, the two tubing members 22a have radial end flanges in the form of radial end beads 84. A bridging leaf spring conductor 94 is employed which may be of the character of any of the previously described leaf springs.

The description herein of the selected embodiments of the invention will suggest various changes, substitutions and other departures from the disclosure within the spirit and scope of the appended claims.

What we claim is:

1. In a coupling joining two tubing ends, each of which is equipped with a radial end flange, wherein the coupling includes annular retainer structure straddling the radial end flanges with said flanges being in confronting spaced relation mechanically interconnecting the two tubing ends, an improvement electrically interconnecting the two tubing ends, comprising:

electrically conductive means inside the annular retainer structure and of a width extending between and contacting said spaced apart radial end flanges of the two tubing ends and serving as a conductor bridge between the two tubing ends.

2. An improvement as set forth in claim 1 in which the radial end flanges of the two tubing ends are flanges of ferrules swaged onto the tubing ends.

3. An improvement as set forth in claim 1 in which the electrically conductive means is attached to the annular retainer structure.

4. An improvement as set forth in claim 1 in which said electrically conductive means is leaf spring means of undulating configuration in longitudinal cross section with at least one outward undulation in contact with the annular retainer structure and with at least one inward undulation in contact with said two radial end flanges, respectively.

5. An improvement as set forth in claim 4 in which said annular retainer structure includes an annular retainer having a web and two inwardly extending side flanges straddling said radial end flanges; and in which said leaf spring means is a leaf spring formed with ears projecting from its opposite sides with said ears being wedged into the annular space.

6. An improvement as set forth in claim 4 in which said annular retainer structure includes an annular retainer having a web and two inwardly extending side flanges straddling said radial end flanges;

in which the annular retainer is made in two sections positioned end-to-end;

and in which said leaf spring is attached to at least one of the two sections to remain therewith when the section is separate from the rest of the coupling.

7. An improvement as set forth in claim 6 in which said leaf spring is wedged between the opposite inner side flanges of the annular retainer section.

8. An improvement as set forth in claim 6 in which the leaf spring is bonded to the annular retainer section.

9. An improvement as set forth in claim 8 in which the leaf spring is metallically bonded to the annular retainer section.

10. An improvement as set forth in claim 8 in which the leaf spring is adhesively bonded to the annular retainer section.

11. An improvement as set forth in claim 6 in which the leaf spring is metallically bonded to an insert in the annular retainer section.

12. An improvement as set forth in claim 6 in which a portion of the leaf spring extends through an aperture in the annular retainer section anchoring the leaf spring thereto.

13. An improvement as set forth in claim 6 in which the leaf spring is lanced forming a tongue, the tongue extending through an aperture in the annular retainer section and bent over anchoring the leaf spring thereto.

14. An improvement as set forth in claim 6 in which the leaf spring is lanced forming two tongues extending through an aperture in one of said annular retainer sections with the tongues bent over in opposite directions anchoring the leaf spring to the annular retainer section.

* * * * *